US008923260B2

(12) United States Patent
Gundavelli et al.

(10) Patent No.: US 8,923,260 B2
(45) Date of Patent: Dec. 30, 2014

(54) MOBILITY IN MULTI-DEVICE MULTI-HOMED DEPLOYMENTS

(75) Inventors: Srinath Gundavelli, San Jose, CA (US); Rajesh Pazhyannur, Milpitas, CA (US); Kent K. Leung, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 123 days.

(21) Appl. No.: 13/312,157

(22) Filed: Dec. 6, 2011

(65) Prior Publication Data

US 2013/0142182 A1 Jun. 6, 2013

(51) Int. Cl.
*H04W 92/00* (2009.01)

(52) U.S. Cl.
USPC ......................................................... 370/338

(58) Field of Classification Search
USPC .................. 370/338, 310, 328, 351
See application file for complete search history.

(56) References Cited

U.S. PATENT DOCUMENTS

| 6,091,951 | A * | 7/2000 | Sturniolo et al. | 455/432.2 |
| 8,341,276 | B1 * | 12/2012 | Bennett et al. | 709/228 |
| 8,431,276 | B2 * | 4/2013 | Zhang et al. | 429/413 |
| 2004/0051733 | A1 * | 3/2004 | Katzir | 345/741 |
| 2007/0204049 | A1 * | 8/2007 | Herrod | 709/227 |
| 2008/0270606 | A1 * | 10/2008 | Gooch et al. | 709/225 |
| 2010/0325424 | A1 * | 12/2010 | Etchegoyen | 713/155 |
| 2011/0302278 | A1 * | 12/2011 | Shim | 709/219 |
| 2011/0302630 | A1 * | 12/2011 | Nair et al. | 726/4 |
| 2013/0016703 | A1 * | 1/2013 | Ranta | 370/336 |

* cited by examiner

*Primary Examiner* — Andrew Lai
*Assistant Examiner* — Zhiren Qin
(74) *Attorney, Agent, or Firm* — Wilmer Cutler Pickering Hale and Dorr LLP

(57) ABSTRACT

Systems and methods for providing identity management and mobility management are disclosed. The management scheme provides mobility in multi-device and multi-homed deployments. A collection of three identities, a device identity, a link layer identity, and a user identity, can be used to provide mobility for a number of devices under different use scenarios. In one embodiment, a method is disclosed for receiving messages from a mobile device at a mobility gateway, the messages including identifiers such as a user identifier, a link layer identifier, and a device identifier where identifiers are stored or retained at the mobility gateway. When a subsequent network attach request is received including one or more identifiers, a reconnection can occur, based on a result of comparing the stored identifiers with the received one or more identifiers.

14 Claims, 6 Drawing Sheets

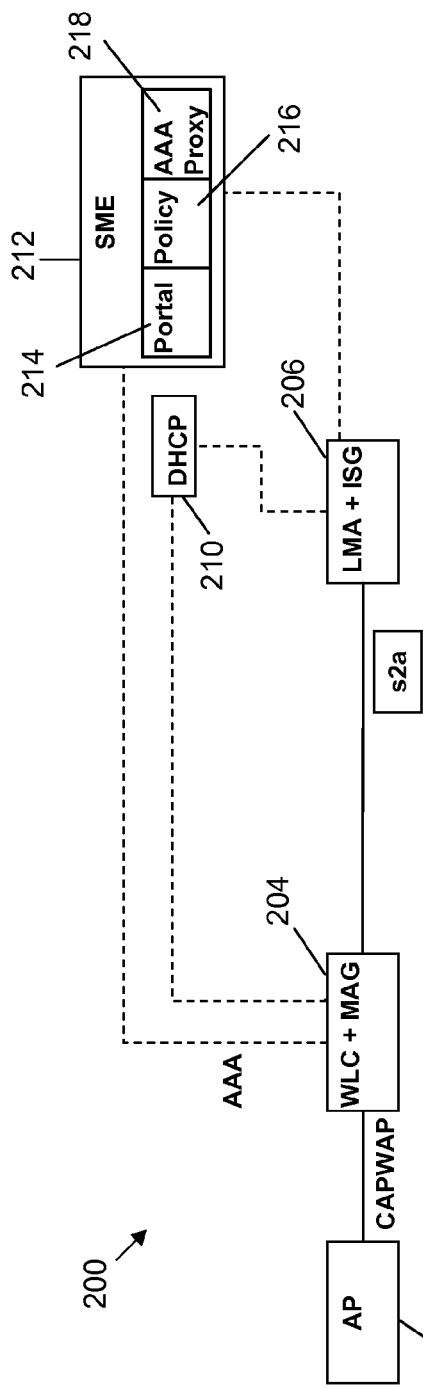
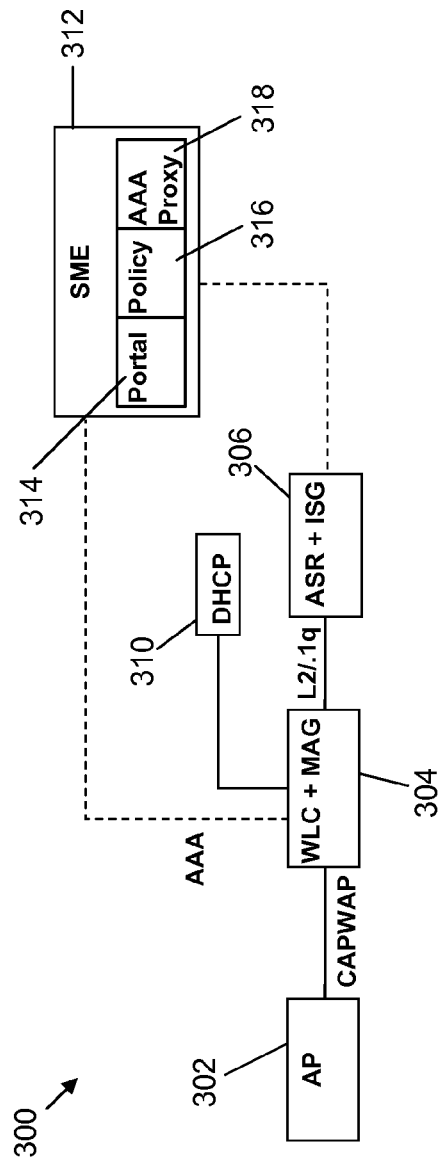

MOBILITY IN MULTI-DEVICE MULTI-HOMED DEPLOYMENTS

TECHNICAL FIELD

This disclosure relates generally to providing network services in IP protocol networks. More specifically, it relates to providing support for IP mobility in multi-device homed deployments by the use of multiple identities for connected mobile users.

BACKGROUND

Many users of modern communications own and operate multiple connected devices simultaneously. For example, it is not uncommon for mobile users to have and use, in addition to a cell phone, other devices such as laptop computers, smartphones, tablets, and personal digital assistants (PDAs). Users may also access communications using different devices at work and at home, and may travel among disparate networks with these devices. Providing access to all devices all the time can create issues.

Each communication technology exists independent of all the others, so that, for example, cell networks operate independently of cable Internet providers and vice versa. However, such technologies are not built for interoperability and have limited extensibility, and providers that wish to provide mobility for multiple devices and multi-homed devices must implement a variety of techniques in order to satisfy user needs. For example, Mobile IP does not provide a method for handling a device with multiple network interfaces (e.g. a multihoming device). As well, Mobile IP and other techniques may not work for devices that are multi-user devices, such as a shared Apple iPad, because they rely on an assumption that a single device shall be used by the same user.

BRIEF DESCRIPTION OF THE DRAWINGS

FIG. 2 is a block diagram of a system using Mobile IP that provides identity detection at a mobile access gateway (MAG), in accordance with some embodiments.

FIG. 3 is a block diagram of a system using simple IP (i.e. not mobile IP) that provides identity detection at a mobile access gateway (MAG), in accordance with some embodiments.

DESCRIPTION OF EXAMPLE EMBODIMENTS

I. Overview

Figure 1:
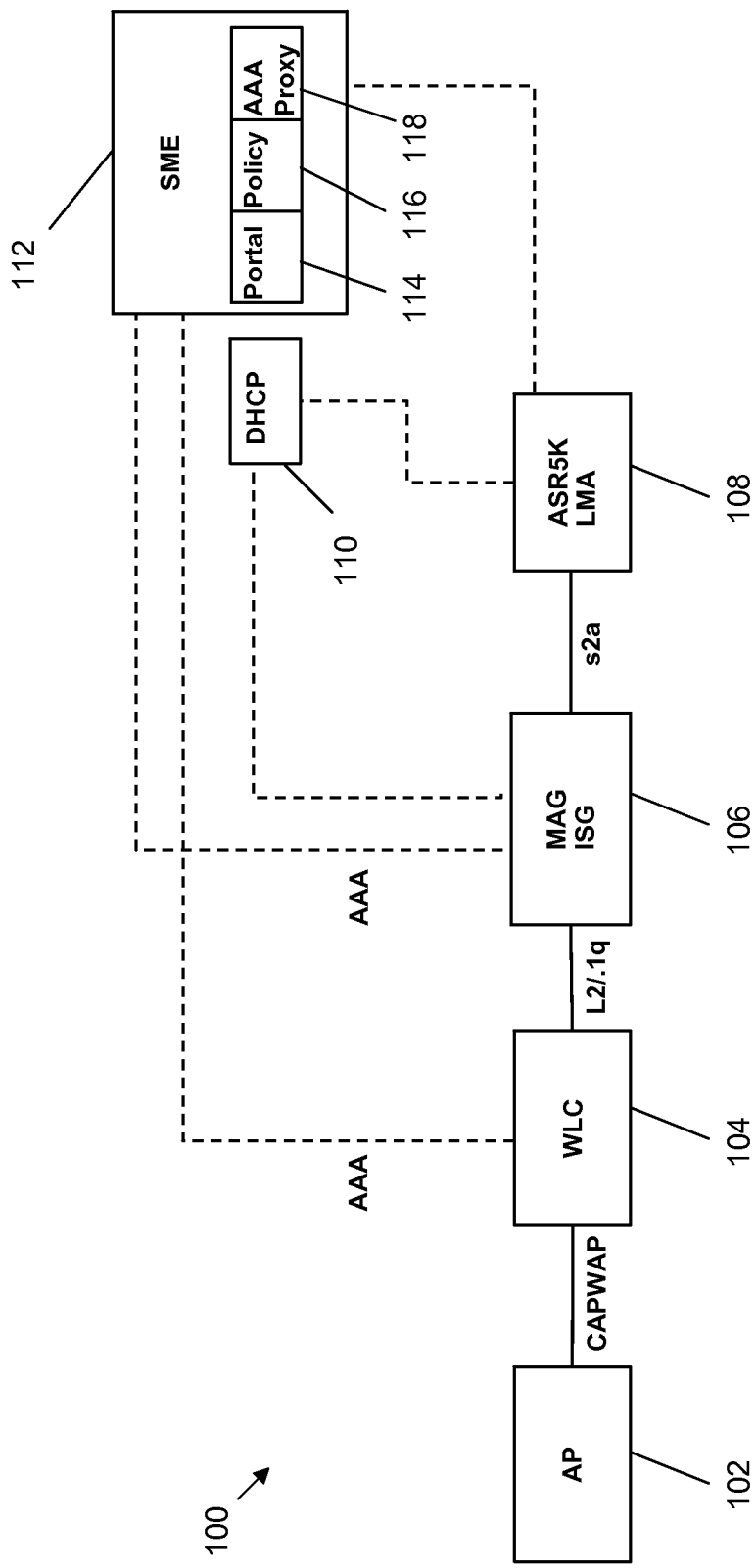
FIG. 1 is a block diagram of a system that provides PMIPv6 at an access gateway with identity detection, in accordance with some embodiments.

A method is disclosed comprising: receiving one or more messages from a mobile device at a mobility gateway over a first network link, the one or more messages containing a user identifier, a link layer identifier, and a device identifier; storing the user identifier, the link layer identifier, and the device identifier at the mobility gateway; receiving a subsequent network attach request containing one or more identifiers; and establishing, based on a result of comparing the retained user identifier, the retained link layer identifier, and the stored device identifier with the received one or more identifiers, one or more sessions from a previous mobility binding at the mobility gateway. This method may further comprise reconnecting when the received one or more identifiers include a first match for the stored user identifier, a second match for the stored link layer identifier, and a third match for the stored device identifier, reconnecting when the received one or more identifiers include a first match for the stored user identifier and a second match for the stored link layer identifier, and a device identifier is unavailable in the incoming request, and reconnecting when the received one or more identifiers include a first match for the stored user identifier and a second match for the stored device identifier, and a received link layer identifier does not match the stored link layer identifier.

This disclosure identifies systems and methods for providing identity management and mobility management for identities. A collection of three identities is described: a device identity, a link layer identity, and a user identity, which may then be used to provide mobility.

A device identity is an identifier which is unique to a particular computing device. A known example of a device identity is a Windows computer name. Each Windows computer has a name that is unique within a particular workgroup or domain. Just as there may be different domains of management for Windows computer names, there is no authoritative domain for a device identifier.

The device identifier may be used to support a multihoming scenario. By determining the device identifier for a connected device on one network interface or network connection, and noticing that the device identifier is the same as that of another connected device on a different network interface or network connection, a network device may detect that the two connected devices are a single multi-homed device. This identification allows such a network device to select an appropriate binding when performing inter-device handovers or other operations that require modification of an attach point of the connected device.

PMIPv6 currently does not support the concept of a device identity. Devices that use PMIPv6, such as cell phones, thus do not have a preexisting feature like the Windows computer name that may be used as a device identity. However, a device identity could be constructed or derived from various characteristics of any hardware device, including a PMIPv6 hardware device, based on data specific to a device such as processor name, processor speed, installed memory and other installed features, serial numbers of hardware components, and other characteristics.

Secondly, a link layer identity may be determined for a network device. A link layer identity is an identifier that is unique to a single network interface using a specific networking medium, such as an Ethernet media access control (MAC) address. An Ethernet MAC address is unique to a specific Ethernet controller, and is determined at the factory when the Ethernet controller is manufactured. It thus provides a unique identifier that can be used to distinguish the specific Ethernet controller when it appears on an Ethernet network. A link layer identity is necessarily specific to a specific link layer, or networking medium. Examples of networking mediums include Ethernet, 802.11a/b/g/n ("WiFi"), EDGE, UMTS, CDMA2000, and Long Term Evolution (LTE). Each of these mediums may have separately-defined link layer schemas. For example, in PMIPv6 the link layer identity can be derived from the Link Layer Identifier option.

Thirdly, a user identity may be determined for a network device. The user identity is unique to the person using the network device, i.e., the user. The same user identity may be shared by multiple network devices as long as they are being operated by the same user. A user identity can be established at the application level by, for example, logging in to a user-facing web site and setting a user cookie on the client device. Subsequent accesses from any client device with the same user cookie may be determined to have the same user identity.

A user identity may be used for billing and accounting to charge the right person for services and network access requested by that person.

In some implementations and on some technologies, a user identity can be the same as a link layer identity or a device identity. One example where an identifier is linked to billing and accounting is with cell phones, where the international mobile subscriber identity (IMSI) is linked to billing. An IMSI is a unique identification number that is stored as a 64-bit field inside a subscriber information module (SIM) card inside of a cell phone. IMSIs share a single domain, according to ITU E.212, such that all networks that use IMSIs interoperate with each other with every user having a unique IMSI. A user may switch the SIM from one phone to another while maintaining identity for the purposes of billing. Thus, a user identity may be based on an IMSI or based instead on a more sophisticated method for tying device access with an individual person.

However, other user identities may be used in some embodiments. Future cellular networks may not use IMSI for user identity tracking. Indeed, other networks such as the global Internet do not use IMSI for user tracking Potential user identities include fully-qualified domain names (FQDNs); FQDN domain namespaces controlled by individuals or organizations; arbitrary network access identifiers (NAIs) according to RFC 4282; Internet Protocol v6 addresses; the PMIPv6 MN-Id field; or other identities. Ultimately, the specific identifier does not matter as long as it is possible to identify, to a reasonable degree of accuracy, the user operating a particular network device.

When all three network identities—device identity, link layer identity and user identity—are collected by a network device, network access can be tailored to the user in a wide variety of situations.

For example, the link layer identity and user identity may be used together to distinguish multiple bindings to a single network from the same user, in a way that would be difficult using solely a user identity or a device identity. For example, if a service were designed to permit access to a single user based on a user identity alone, it would likely prevent a single user from accessing the service simultaneously with multiple devices, even though the user could be operating each of the multiple devices simultaneously.

In another exemplary scenario, a user identity may be used by a network device such as a local mobility anchor (LMA) to apply user-specific policy to a mobility session. The user identity may also be required to distinguish sessions from different users on the same device, such as successive and non-concurrent sessions. In the non-concurrent cases, the LMA may distinguish the sessions as coming from separate users and then may treat them separately, by, for example, assigning different home agents.

In another exemplary scenario where the same user identity is associated with a multihomed device connected to a cell network as well as a WiFi-only device, determining the user identity of the user for each device allows billing to the same user, the shared use of timed services on both devices during a specified time window, and other use cases that are advantageous for the user.

In the case of embodiments that use PMIPv6, one or more of the following methods may be used to associate these three identities with a mobility binding.

In one embodiment, the three identities may be carried separately in optional elements or information elements, such as PMIP device ID optional elements. For example, user identity may be contained in the MN-Id, the link layer (LL) identifier may be contained in the Link Layer Identifier option, and the Device Identifier may be contained in a newly defined Device Identifier Option (not currently defined in RFC 5131).

In another embodiment, all three identities are combined in a standard mobile node identification (MN-Id) information element through some form of MN-Id decoration. Decorating the MN-Id is performed by adding additional information elements to the Mn-Id. The MN-Id combination is done in a such a manner that the three identities can be uniquely identified.

In another embodiment, the network access identifier (NAI) may be extended to support additional identity information. Currently, NAIs are stored and transmitted in the format "user@domain," but the NAI format does not distinguish between user identity, device identity and link layer identity. A system with NAI support may be modified to indicate which of the three identities are being communicated. Alternatively, a special format may be used to incorporate a combination of user, device and link layer identity into the "user@domain" structure of the NAI.

When the three identities are collected, mobility may be provided for sessions. Sessions should be interpreted as end-to-end connectivity based on network protocols, and should not be limited either to a specific layer of the OSI Layer model, such as the application layer, nor should it be interpreted as connectivity using any specific protocol or technology. Rather, a session results in a communication between a user's device and a remote server, with this communication allowing for various services to be provided to various aspects of the user's device, networking stack, or application. Using mobility provides sessions with continuity, such that a user may seamlessly reconnect to a previous session upon connecting to a network, even a physically distinct network than the network used to originally establish the session. Mobility for a session can include reconnection of a previous session. This may include previously-disconnected sessions. The reconnection can include establishing the session using the previously stored parameters, connecting without having to renegotiate the previously stored parameters, or continuing a previously established session.

This disclosure relates to systems and methods for performing collection of all three identities.

II. Use Cases

Various use cases for the collection of three identities are presented below. The below use cases may be supported by one or more embodiments.

Single User, Multiple Devices.

Today, there is no mobility for a single user across multiple devices when accessing online services such as video streaming services. It is possible to log into the video server from a second location, but this access requires that the user restart his or her session. When it is possible to identify a single user using multiple devices, a service provider may allow a user to have wireless LAN (WLAN) access or other network access over multiple devices (phone, laptop, game console, etc). This may allow a user to, for example, watch video from a Comcast cable network subscriber-access video streaming server using two Apple iPads or other tablet device, where one is a 3G iPad and the other is a WiFi iPad. This could be done using a single subscription (and subscriber ID).

Concurrent Session, Multihomed Device.

In the case that a given device has multiple interfaces (WiFi, 3G/4G, Ethernet, etc), it can be beneficial to have a device identifier to distinguish multihomed device flows from flows on WiFi-only devices. The service provider may offer service over multiple interfaces (3G/4G+WiFi, WiMAX+ WiFi, 802.3+WiFI). In some cases, such as with a 3G+WiFi phone, there is a unique user identifier associated with the multihomed device (such as may be provided by the IMSI). However, in certain cases the same user identifier (e.g., for WiFi) can be used in multihomed devices (laptop with WiFi and Ethernet) as well as single-mode WiFi devices simultaneously, allowing all devices to use the services authorized for that user. This allows a user to maintain a concurrent session even as the user switches from using one network interface to another.

Single Device, Multiple Locations.

In the case that a single device is moved to another network, it may be necessary to identify the device as belonging to the same user before providing services to the device at the second network. This is a well-understood process for cell phones on roaming networks or handed over to other networks at the same service provider, but this process is not well-defined for network devices other than cell phones. The collection of each of the three identities makes a handover procedure possible for the general case. For example, a user may be enabled to take an iPad, move to a neighbor's house, and reconnect to a previously-identified service. Without identity collection, a local mobility anchor (LMA) or mobility access gateway (MAG) may not know whether one device or two different devices are being used, or whether two devices are being shared by the same user. With identity collection, this information becomes clear. This is similar to the case described in the previous paragraph, except that session continuity is supported across non-concurrent network accesses.

Multiple Users, Same Device.

In the case that there are multiple user identities associated with the same device, identification of each user may be obtained and different instances from the same device identifier/link identifier may be distinguished to provide access and billing to the appropriate user. This is also the case where the same device is used by different users in a non-concurrent manner.

User has Subscription with Multiple WLAN Providers.

In the case that a single user has a subscription with multiple wireless LAN providers, such as cell phone providers and mobile hotspot providers, the user may be using a multihomed device or multiple devices, each with access to one of the multiple networks. When this is the case, the appropriate services must be provided to the user on all wireless networks.

In some embodiments, device identity is used in PMIP bindings to handle the multi-device, multihomed device mobility deployment case. In some embodiments, methods in a mobile access gateway (MAG) provide bindings based on a combination of user, link and session identities, as described in the above use cases. In other embodiments, methods in the MAG may be used to determine whether an incoming binding request matches an existing binding request, where the binding request can be one of the different types described above. A plurality of the features described may be combined into a single embodiment.

III. Obtaining Identities at a Mobile Access Gateway (MAG)

In some embodiments, the three identities described above are obtained by a mobile access gateway (MAG) on a mobile access network. The MAG may reside on a packet data serving node (PDSN) or access gateway. One MAG may be present on the mobile access network for every accessible remote network. Identity acquisition can be performed when an event occurs, such as a Layer 2 attach, a DHCP request, ARP request, or DNAv4 inquiry, where the event occurs at a GGSN, or at any layer 2 termination point.

When creating a PMIP registration, the MAG may become aware of these three identities. There are three triggers that may cause a MAG to initiate a new PMIP registration:

Layer 2 Attach Notifier:

After the mobile node (MN) completes the Layer 2 attachment, the MAG may be notified by a mechanism specific to the Layer 2 that the subscriber is attached. This can trigger a PMIP registration message.

DHCP:

The MN requests an IP address through DHCP. The MAG behaves as a DHCP server or DHCP relay and uses the DHCP message as a trigger to initiate PMIP registration.

ARP/DNAv4 Procedure:

When a subscriber moves between MAGs it may attempt a DNAv4 (Discovery of Network Attachment) procedure by sending an ARP request to the MAG. This ARP request may initiate PMIP registration.

In some embodiments, to provide a link layer identity or link layer identifier, a value may be selected that is based on the physical address of the relevant network interface. This physical address may be a media access control (MAC) address.

In the case that Dynamic Host Control Protocol (DHCP) is used, a Client Hardware Address (CHADDR) field in the DHCPDISCOVER message can be used by the MAG as the link layer identifier. The CHADDR field typically contains the MAC address or a value derived from the MAC address.

In the case that Address Resolution Protocol (ARP) is used, or where Detecting Network Attachment v.4 (DNAv4) is used, the MAG may use the source MAC address as the link layer identifier. DNAv4 is defined in IETF RFC 4436.

In some embodiments, when determining a user identity for a mobile device that connects to a MAG, the MAG may collect information for use as a user identity. This information may be different depending on whether the mobile device connects to the network using DHCP or ARP/DNAv4, or another method. This information may be based on a network access identifier (NAI).

A network access identifier (NAI), which is defined in IETF RFC 4282, is an Internet standard for providing a user identity during network authentication. The NAI is a string that is formatted like an email address, of the form "user@realm."

The MAG may use the DHCP Client identifier to retrieve a user identity. This user identity may be a NAI. If a NAI or client identifier is not present, then the MAG may not use a user identity. Alternatively, the MAG may use the link layer identity, such as a CHADDR, as a username and a locally configured realm as a realm for a user identity formed as a NAI.

For ARP/DNAv4, the MAG may query an authentication server, such as an Authentication, Accounting and Authorization (AAA) server, for a user identity. This user identity may be a NAI. The query is indexed by, or includes, the source MAC address present in the ARP request. If the AAA returns a username then the MAG stores it as a user identity. Otherwise, the MAG may not use a user identity, or may use the source MAC address as the username and a locally configured realm for a user identity formed as a NAI.

In some embodiments, a MAG may determine a device identity for a mobile device that connects to the MAG. The MAG may collect information for use as a device identity. This information may be different depending on whether the mobile device connects to the network using DHCP or ARP/DNAv4, or another method.

The MAG uses a DHCP Client Identifier option to retrieve the device identity, such as a NAI. In one implementation a mobile device may send a client identifier containing, or decorated with, a device identifier. The device identifier is unique across all network interfaces on this device. Specifically, DHCP requests on all interfaces may contain the same device identifier in the Client Identifier. On interfaces where alternate mechanisms are used to obtain IP addresses, such as Internet Key Exchange (IKE) v.2, the device may use an alternate mechanism to provide the same device identifier to the MAG.

For ARP/DNAv4, the MAG may query the AAA for a device identity. The query may be indexed by a source MAC address present in an ARP request. If the AAA returns a device identifier, then the MAG may record the identifier as the device identity. The MAG may alternately not use the device identifier.

In some cases the device identity may not be available at the time that binding registration occurs, but may become available at a later time. For example, a MAG initiating a Proxy Binding Update (PBU) based on an ARP request may not yet have a device identity for a requesting mobile device. However, a subsequent DHCP Renew may provide the device identity to the MAG. In this case, the MAG may re-register or perform another PBU, this time with a device identity.

IV. Implementation on Local Mobility Anchor (LMA)

Identities can be obtained at a Local Mobility Anchor as well as at a Mobile Access Gateway (MAG). When a mobile node moves to a new network and a Mobile IP registration request is made by a mobile node, the LMA keeps a record of the home address and care-of address of the mobile node in a binding cache. In certain embodiments, this binding cache may also be used to preserve user, link and device identities and as a general mobility session state. However, when the mobile node moves to a new network, associating with a new MAG, one or more of the mobile node's identities may have changed. If this is the case, the LMA may obtain one or more of the mobile node's identities and may check the newly-obtained identities against previously-stored identities in the binding cache. The LMA uses the various identifiers as BCE (binding cache entry) keys to determine whether an incoming binding request matches an existing binding. To detect the identifiers, the LMA may perform the following steps in a sequential manner.

1. If all three identities are present in an incoming request and match the corresponding identities in a BCE, then the existing entry may be a candidate for further validation of network address, prefix, etc.

2. If the condition in #1 is not met but the user identity and link layer identity match, and a device identity is unavailable in the incoming request, then existing entry may still be a candidate for further validation of network address, prefix, etc. This is the potential case of inter/intra MAG handover.

3. If the condition in #1 is not met but the user identity and device identity match and the link layer identity does not match, then the existing entry remains a candidate for further validation of network address, prefix, etc. This is to handle the case of intra-device handover.

4. If none of the above conditions hold, then the incoming request is a new binding request.

To handle systems where a unique User Identity is assigned to a multihomed device (for example an IMSI in a 3G phone is unique to the device and is used for User Identity in 3G devices), then the rules specified in RFC 5213 apply instead of the above rules.

Following the four rules above, at least four potential scenarios may arise when the new and previously-stored identities are compared: 1. All three identities match; 2. the user identity and link layer identity match but the device identity does not match; 3. the user identity and device identity match but the link layer identity does not match; and 4. the user identity does not match, or more than one identity does not match.

In scenario 1, the same user has not moved and retains all previous identities. The LMA becomes aware that the user is still connected to the same MAG.

In scenario 2, the device identity may not match because in certain situations, the device identity cannot be obtained. This may occur when a device moves to a new network, as many devices use media sense techniques to determine when an underlying physical link has been dropped and/or newly established, and automatically perform ARP or DHCP renew steps accordingly. Neither ARP nor DHCP renew are events that necessarily result in the obtaining of the device identity. Thus, when the device identity is missing or does not match, the LMA uses this information to deduce that the mobile node has changed to a different MAG.

In scenario 3, when the LMA detects that the user identity and device identity are the same but that the link identity is different, the LMA may deduce the same user may be using the same device, but using a different link. For example, a smartphone with 3G data connectivity may go from using 3G to using WiFi at a home hotspot. In this situation it is advantageous for the LMA to reconnect, persist or maintain connections to the device and to migrate connections if possible to the new link.

In scenario 4, if the user identity does not match, the LMA may interpret this as a different user on the same device. In this case it is not necessary to persist any connections, and this is handled as a new attach request. In the same way, if more than one identity does not match, this is a new attach request.

V. Figures

Various embodiments of systems and methods providing the above functionality are described. These embodiments may support Simple IP, Mobile IP, or both. The embodiments may support web authentication procedures, 802.1x authentication procedures, or a combination thereof. The below embodiments may support both an Authentication, Authorization and Accounting (AAA) policy interface, a RADIUS/RADIUS-CoA policy interface, a Gx/Rx interface, or a combination thereof. The below embodiments may also support IPv4 or IPv6. Either a higher-priority DHCP server mode or a DHCP relay mode may be supported on a mobility access gateway (MAG).

FIG. 1 is a block diagram of a system that provides PMIPv6 at an access gateway with identity detection, in accordance with some embodiments. System 100 includes an access point (AP) 102, a wireless LAN controller (WLC) 104 connected to the AP 102 via a CAPWAP interface, a mobility access gateway (MAG) 106 connected to the WLC via an L2/.1q interface, a local mobility anchor (LMA) 108 connected to the MAG via an s2a interface, and station management entity (SME) 112. WLC 104 and MAG 106 connect to SME 112 for authentication, authorization and accounting (AAA) services. LMA 108 is also connected to SME 112. A dynamic host control protocol (DHCP) server 110 also provides DHCP services in connection with MAG 106 and LMA 108. Within SME 112 are portal 114, policy 116, and AAA proxy 118 modules. MAG 106 may be co-located on the same platform as a Cisco Intelligent Services Gateway. LMA 108 may be implemented on a Cisco ASR 5000 series network device. WLC 104 may be on the same layer 2 network as a Cisco ASR 1000 series network device (not shown).

FIG. 2 is a block diagram of a system using Mobile IP that provides identity detection at a mobile access gateway (MAG), in accordance with some embodiments. System 200 includes an access point (AP) 202. Wireless LAN controller (WLC) 204 is connected to the AP 202 via a CAPWAP interface, and WLC 204 also incorporates a mobility access gateway (MAG). WLC 204 is connected to a local mobility anchor (LMA) 206 via an s2a interface. LMA 206 may be a Cisco Intelligent Services Gateway. WLC 204 connects to station management entity (SME) 212 for authentication, authorization and accounting (AAA) services. LMA 206 is also connected to SME 212. SME 212 contains portal 214, policy 216, and AAA proxy 218 modules. A dynamic host control protocol (DHCP) server 210 is also connected to WLC 204 and LMA 206.

FIG. 3 is a block diagram of a system using simple IP (i.e., non-mobile IP) that provides identity detection at a mobile access gateway (MAG), in accordance with some embodiments. System 300 includes an access point (AP) 302. As in FIG. 2, wireless LAN controller (WLC) 304 is connected to the AP 302 via a CAPWAP interface, and WLC 304 also incorporates a mobility access gateway (MAG). MAG/WLC 304 may be connected to gateway 306, which may include a Cisco Intelligent Services Gateway, as well as an aggregation services router (ASR) such as a Cisco ASR 1000. MAG/WLC 304 connects to station management entity (SME) 312 for authentication, authorization and accounting (AAA) services. Gateway 306 is also connected to SME 312. SME 312 contains portal 314, policy 316, and AAA proxy 318 modules. A dynamic host control protocol (DHCP) server 310 is also connected to MAG/WLC 304. Note that the MAG is distinct from the DHCP server 310 in some embodiments, as shown in FIG. 3, but MAG/WLC 304 may also serve as a DHCP server in some embodiments, and as a DHCP relay in other embodiments.

Figure 4:
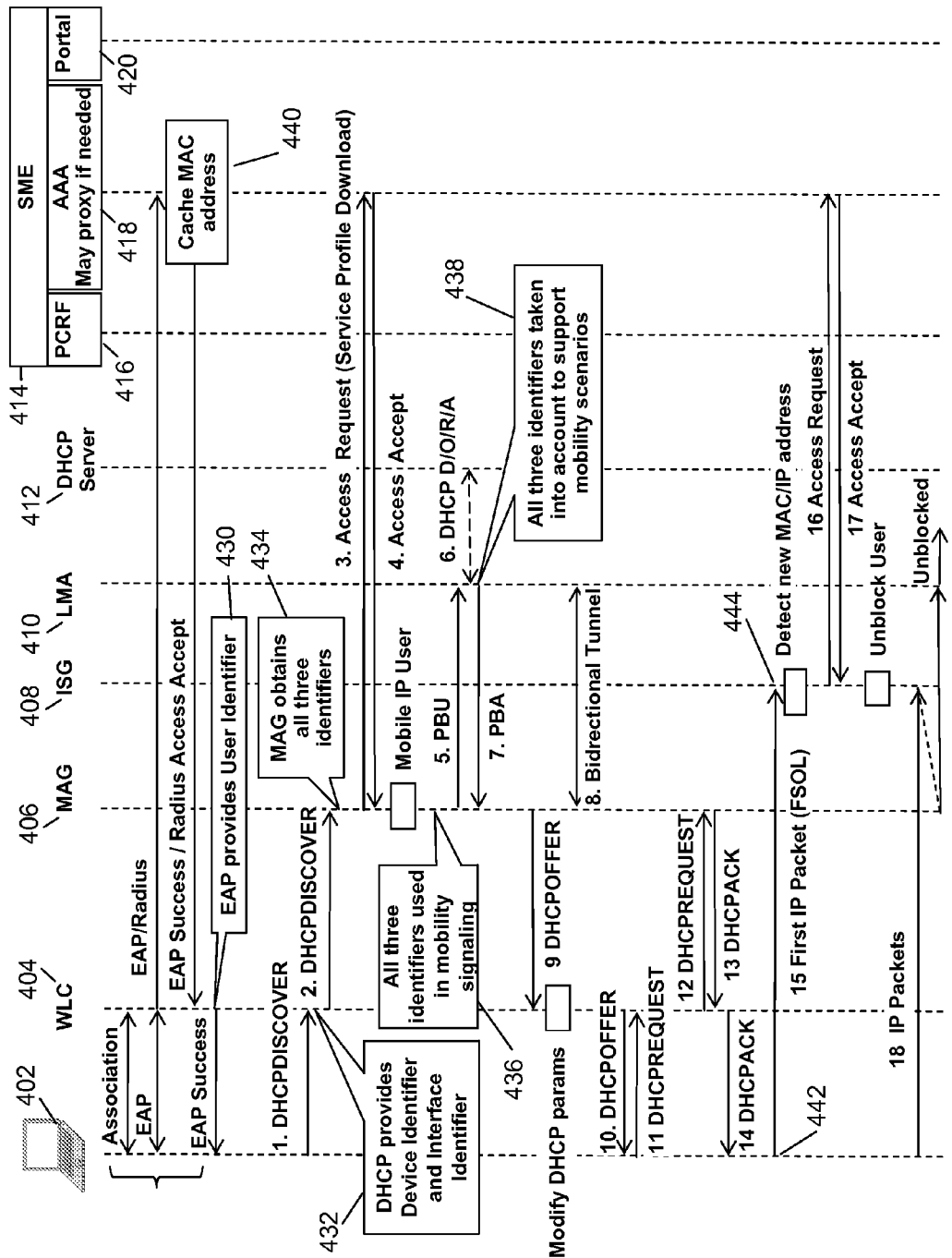
FIG. 4 is an exemplary call flow for a system that provides identity detection in accordance with some embodiments.

FIG. 4 is an exemplary call flow for a system using web authentication and simple IP and that provides identity detection in accordance with some embodiments. A mobile device 402, a wireless LAN controller (WLC) 404, a mobility access gateway (MAG) 406, an intelligent services gateway (ISG) 408, local mobility anchor (LMA) 410, dynamic host configuration protocol (DHCP) server 412, and station management entity (SME) 414 including policy charging and rules function (PCRF) 416, authorization, authentication, and accounting (AAA) server 418, and portal 420 are provided. Similar components with similar functions are provided in other embodiments.

Mobile device 402 may associate with wireless LAN controller 404 using any of a variety of means, such as Extensible Authentication Protocol (EAP). Mobile device 402 then messages AAA 418 using EAP/RADIUS with a request to authenticate. If mobile device 402 supplies the right credentials, AAA 418 responds with an EAP Success message or RADIUS Access Accept message. This message is received at WLC 404 and transmitted to mobile device 402. The EAP Success message provides a User Identifier, as identified at step 430, and this may be cached at the WLC in some embodiments. Note that while a MAC address of mobile device 402 is cached at the AAA in step 440, it is not communicated back to the WLC 404 or the MAG 406.

Mobile device 402 may subsequently attempt to register with local mobility anchor 410 which may operate according to the PMIPv6 protocol. This process is initiated by the mobile device 402 sending a DHCPDISCOVER message to the WLC 404, as is shown at step 432. Step 432 shows also that the DHCPDISCOVER message may provide more than one identifier, such as both a device identifier, such as a Windows NetBIOS name or cell phone IMSI, and an interface identifier, such as a MAC address, to the WLC 404. In some embodiments, the user identifier has been previously obtained and cached at the WLC in step 430. At step 434, WLC 404 may forward the DHCPDISCOVER message to MAG 406, including all three identifiers available to it, resulting in the MAG obtaining all three identities of mobile device 402.

Once MAG 406 has obtained all three identities, it uses all three identities when performing mobility signaling on behalf of mobile device 402. MAG 406 includes these identifiers when performing a Proxy Binding Update to LMA 410. At step 438, the LMA 410 takes all three identifiers into account when providing mobility, including considering one or more of the scenarios or use cases described in the above text. LMA 410 may perform DHCP DISCOVER/OFFER/REQUEST/ACK as necessary to obtain an IP address from DHCP server 412 that takes into account the use cases above, and that enables reconnection or reprovisioning to previously-accessible resources. LMA 410 then sends a Proxy Binding Accept message back to MAG 406, which then sends a DHCPOFFER message via WLC 404 to mobile device 402. The user of mobile device 402 may now regain access to one or more services that may have been in use previously.

At step 442, a first sign of life (FSOL) IP packet is sent from a mobile device to the ISG. A FSOL packet may be a packet received from a new mobile device. A FSOL packet may also be a packet indicating after a period of inactivity, a previously-connected mobile device has returned to an active state. This is the case for the FSOL packet received from mobile device 402 at step 444. Upon receiving a FSOL packet, MAG 406 or ISG 408 checks to see if the MAC address of the packet matches a previously-seen MAC address, or if the IP address of the packet matches a previously-seen IP address. In the case shown at step 444, the MAC address is the same, and has previously been stored at step 440, but the IP address may be different. MAG 406 or ISG 408, in conjunction with AAA server 418, may perform identity detection on the received FSOL packet using previously-obtained identity parameters to determine whether a mobile device is the same device that was identified previously. In the case of mobile device 402, MAG 406 and AAA server 418 permit access to resources that were previously requested at step 432 without reauthorizing, based on previously-cached identity information and on identity detection step 438.

The mobile device described above can communicate with a plurality of radio access networks using a plurality of access technologies and with wired communication networks. The mobile device can be a smart phone offering advanced capabilities such as word processing, web browsing, gaming, e-book capabilities, an operating system, and a full keyboard. The mobile device may run an operating system such as Symbian OS, iOS, RIM's Blackberry, Windows Mobile, Linux, Palm WebOS, and Android. The screen may be a touch screen that can be used to input data to the mobile device and the screen can be used instead of the full keyboard. The mobile device may have the capability to run applications or communicate with applications that are provided by servers in the communication network. The mobile device can receive updates and other information from these applications on the network.

The mobile device also encompasses many other devices such as televisions (TVs), video projectors, set-top boxes or set-top units, digital video recorders (DVR), computers, netbooks, laptops, and any other audio/visual equipment that can communicate with a network. The mobile device can also keep global positioning coordinates, profile information, or other location information in its stack or memory. The mobile device can have a memory such as a computer readable medium, flash memory, a magnetic disk drive, an optical drive, a programmable read-only memory (PROM), and/or a read-only memory (ROM). The mobile device can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The mobile device can also provide a variety of user interfaces such as a keyboard, a touch screen, a trackball, a touch pad, and/or a mouse. The mobile device may also include speakers and a display device in some embodiments.

The identity detection capability described above is implemented in a network device in some embodiments. This network device can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA).

In certain embodiments, the functionalities are provided by a combination of hardware and software in the network device. General-purpose hardware can be configured in the network device to provide one or more of these specialized functionalities. The gateway can also support sessions originated from a femto base station, which would connect to the gateway using a broadband network. A person or corporation may use a femto base station in a home or business to support one or more mobile nodes. The gateway can provide trigger based traffic management during a handoff from a femto base station to a macro base station, while maintaining traffic management for the mobile node. The media delivery enhancement gateway can be implemented as any combination of the following including an xGSN, an xGW, an xGW-SGW, and an xGW-PGW.

In some embodiments the network device can be implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below.

Figure 5:
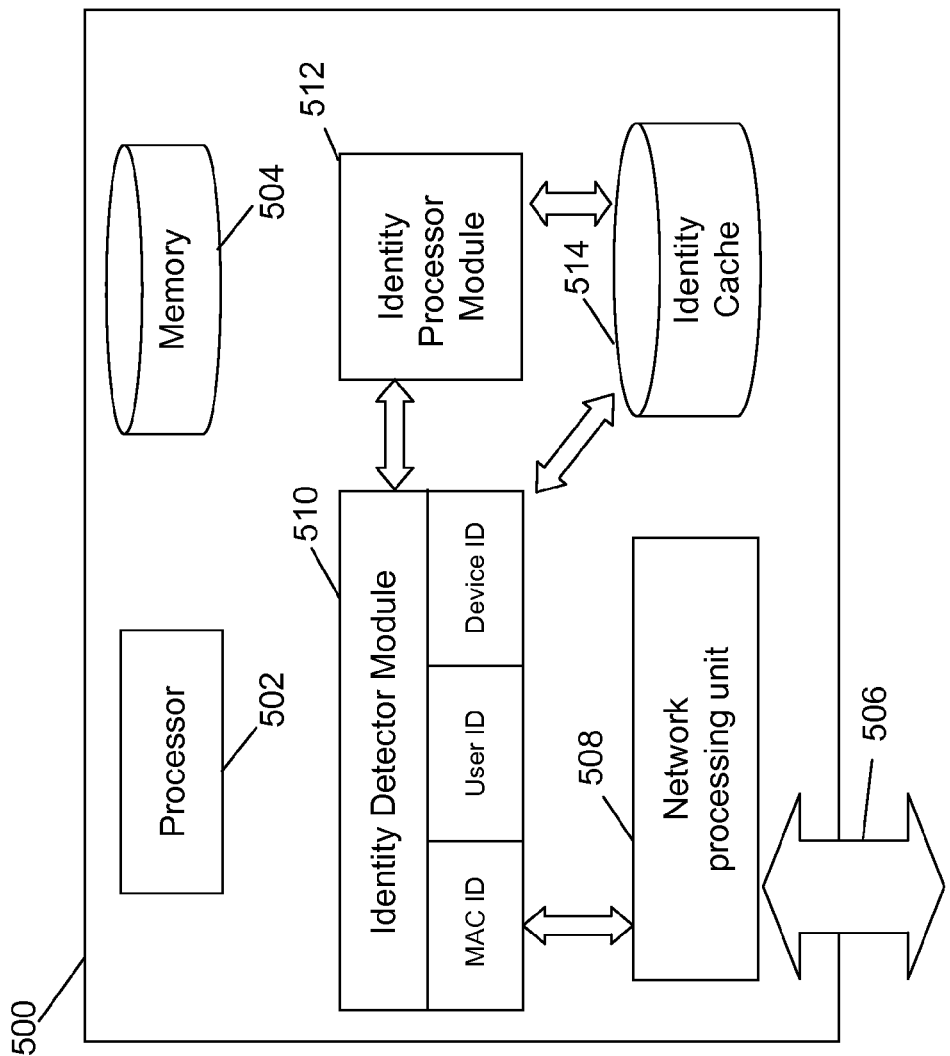
FIG. 5 shows a block diagram of a network device with identity detection in accordance with some embodiments.

FIG. 5 illustrates the implementation of a network device in accordance with some embodiments. Network device 500 contains processor 502 and memory 504, which enable the operation and configuration of the device. Network device 500 also contains network processing unit 508, identity detector module 510, identity processor module 512, and identity cache 514. Network processing unit 508 receives packets from network interface 506, which is connected to one or more networks (not shown). Network processing unit 508 is responsible for performing gateway functions, interworking functions, or other functions relating to the core functionality of the gateway, such as DHCP serving, routing or bridging. Identity detector module 510 receives relevant packets from network processing unit 508 and examines them to identify a MAC ID, a user ID, and/or a device ID, in accordance with the above description, according to some embodiments. These identities are transferred to identity cache 514. At certain times, identity processor module 512 is invoked to determine whether or not a connected device is a device which has previously been detected, or a new device, based on the three identities determined by the identity detector module 510.

Figure 6:
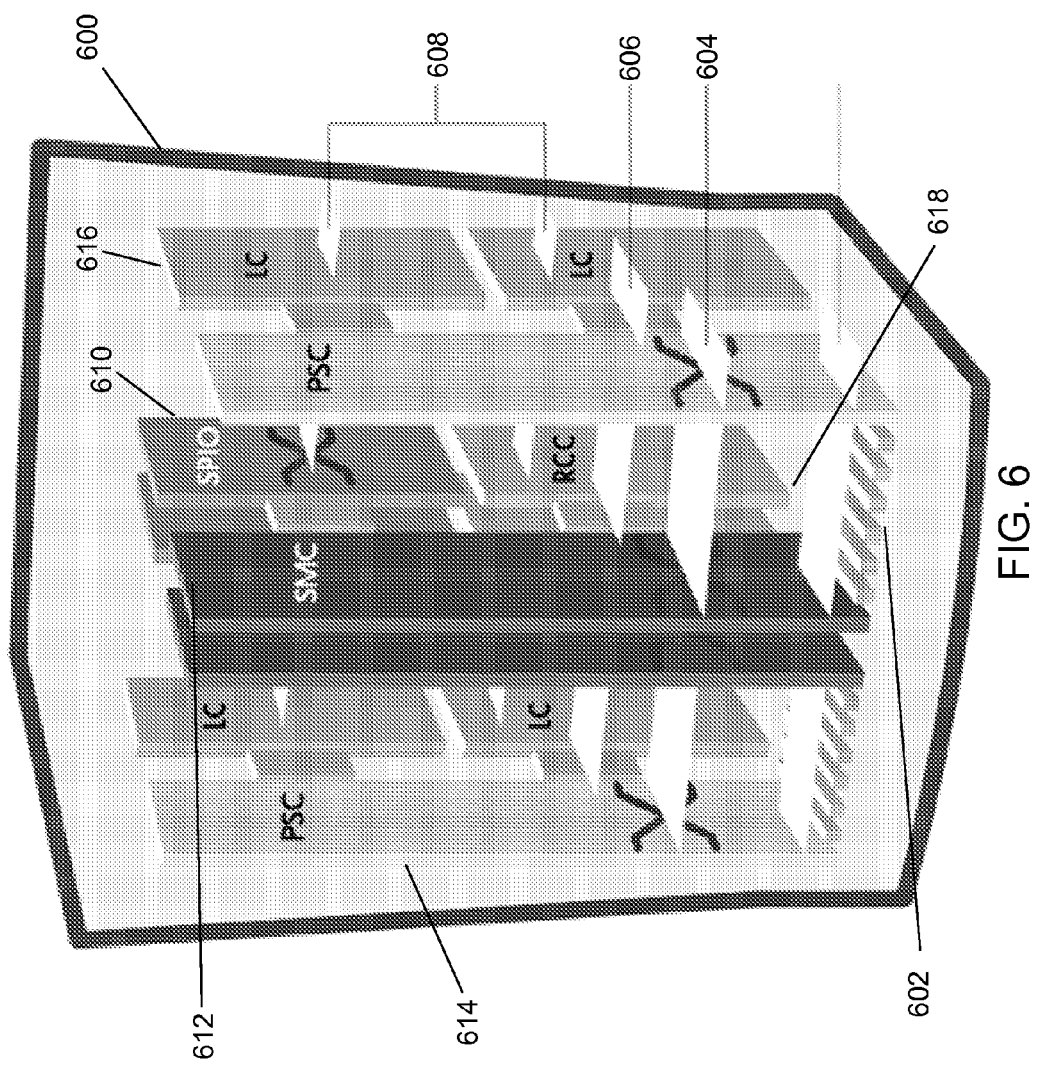
FIG. 6 illustrates the implementation of a network device in accordance with some embodiments.

FIG. 6 further illustrates the implementation of a network device in accordance with some embodiments. The network device 600 includes slots 602 for loading application cards and line cards. A midplane can be used in the network device to provide intra-network device communications, power connections, and transport paths between the various installed cards. The midplane can include buses such as a switch fabric 604, a control bus 606, a system management bus, a redundancy bus 608, and a time division multiplex (TDM) bus. The switch fabric 604 is an IP-based transport path for user data throughout the network device implemented by establishing inter-card communications between application cards and line cards. The control bus 606 interconnects the control and management processors within the network device. The network device management bus provides management of system functions such as supplying power, monitoring temperatures, board status, data path errors, card resets, and other failover features. The redundancy bus 608 provides transportation of user data and redundancy links in the event of hardware failures. The TDM bus provides support for voice services on the system.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group, users in another sub-group will not be affected by that problem.

The architecture also allows checkpointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

A virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can set up a MIPv4 termination and set up a PMIPv6 session towards the core network. A session manager can track the mapping of the sessions and processing to provide the emulation and interworking between the networks. A database can also be used to map information between the sessions, and store, for example, NAI, HoA, AE information in some embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power.

Figure 7:
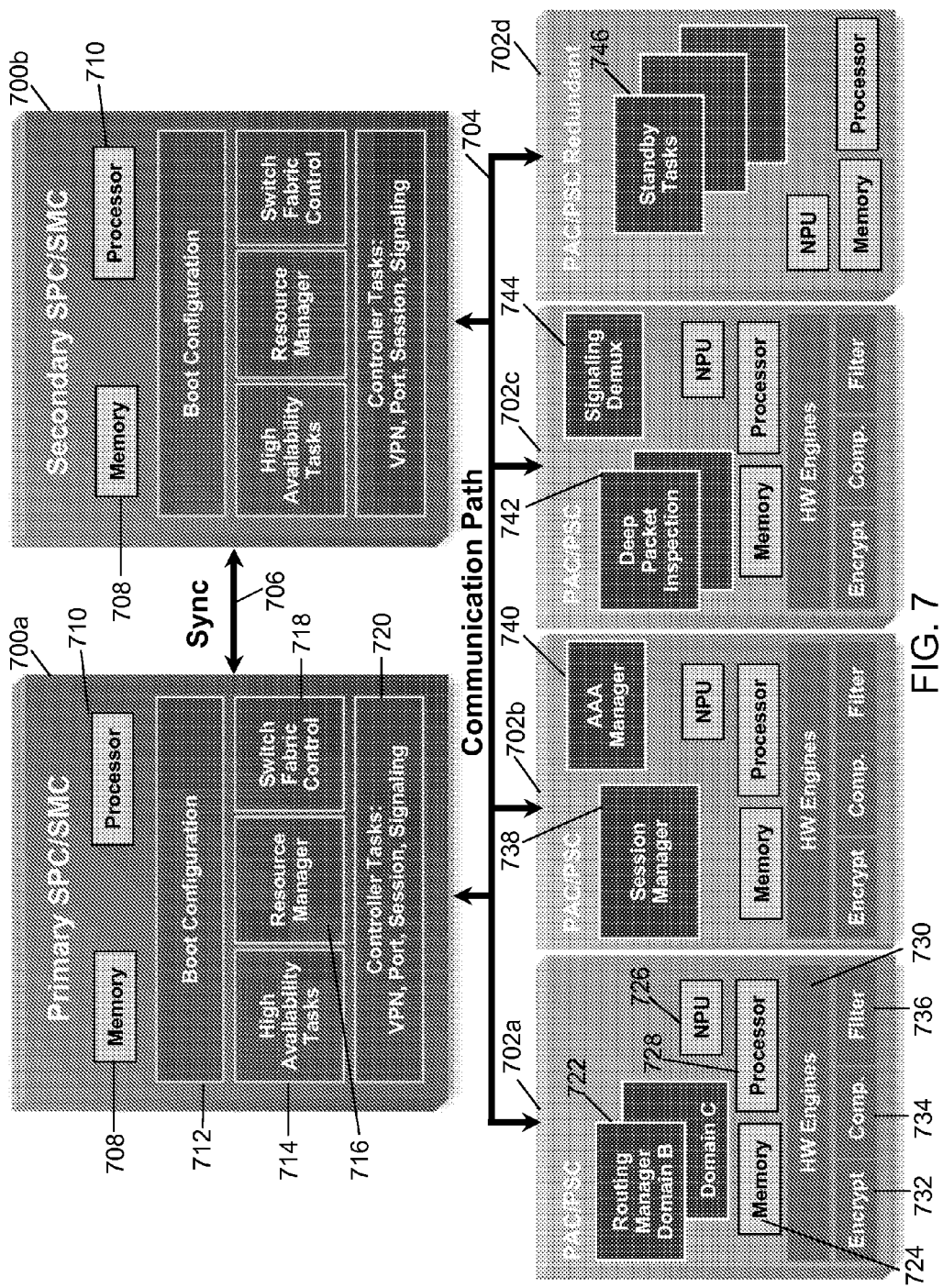
FIG. 7 illustrates a logical view of the software architecture of a network device in accordance with certain embodiments.

FIG. 7 illustrates a logical view of the software architecture of a network device in accordance with certain embodiments. As shown, the software and hardware can be distributed within the network device and across different circuit boards, processors, and memory. FIG. 7 includes a primary switch processor card (SPC)/system management card (SMC) 700a, a secondary SPC/SMC 700b, PAC/PSCs 702a-1002d, a communication path 704, and a synchronization path 706. The SPC/SMC 700 includes a memory 708, a processor 710, a boot configuration 712, high availability tasks 714, resource manager 716, switch fabric control 718, and controller tasks 720.

The SPC/SMC 700 manages and controls the network device, including the other cards in the network device. The SPC/SMC 700 can be configured in a primary and secondary arrangement that provides redundancy and fail-safe protection. The modules or tasks running on the SPC/SMC 700 are related to network device-wide control and management. The boot configuration task 712 includes information for starting up and testing the network device. The network device can also be configured to start up in different configurations and provide different implementations. These can include which functionalities and services are capable of running on the SPC/SMC 700. The high availability task 714 maintains the operational state of the network device by monitoring the device and managing recovery efforts to avoid disruption of service. The resource manager tracks and assigns the available resources for sessions and other loads on the network device. This can include load balancing among different processors and tasks running on the network device. Processes can be distributed across the system to fit the needs of the network model and specific process requirements. For example, most tasks can be configured to execute on SPC/SMC 700 or PAC/PSC 702, while some processor intensive tasks can also be performed across multiple PACs/PSCs to utilize multiple CPU resources. Distribution of these tasks is invisible to the user. Switch fabric control 718 controls the communication paths in the network device. Controller tasks module 720 may manage the tasks among the resources of the networks to provide VPN services, assign ports, and create, delete, and modify sessions for a mobile device.

The PACs/PSCs 702 are high-speed processing cards that are designed for packet processing and the tasks involved with providing various network functionalities on the network device. The PACs/PSCs 702 may each include a memory 724, a network processing unit (NPU) 726, a processor 728, a hardware engine 730, an encryption component 732, a compression component 734, and a filter component 736. Hardware engines 730 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 702 is capable of supporting multiple contexts. The PACs/PSCs 702 are also capable of running a variety of tasks or modules. PAC/PSC 702a provides routing managers 722 with each covering routing of a different domain. PAC/PSC 702b provides a session manager 738 and an AAA manager 740. The session manager 738 manages one or more sessions that correspond to one or more mobile devices. A session allows a mobile device to communicate with the network for voice calls and data. The AAA manager 740 manages accounting, authentication, and authorization with an AAA server in the network. PAC/PSC 702 provides a deep packet inspection task 742 and a signaling demux 744. The deep packet inspection task 742 provides inspection of packet information beyond layer 4 for use and analysis by the network device. The signaling demux 744 can provide scalability of services in combination with other modules. PAC/PSC 702d provides redundancy through standby tasks 746. Standby tasks 746 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, the identity collecting function may be performed at a proxy within the WLC.

We claim:

1. A method comprising:
    receiving one or more messages from a mobile device at a mobility gateway over a first network link, the one or more messages containing a user identifier, a link layer identifier, and a device identifier;
    storing the user identifier, the link layer identifier, and the device identifier at the mobility gateway;
    receiving a subsequent network attach request containing second received identifiers, including at least a user identifier, a link layer identifier, and a device identifier;
    comparing the stored set of identifiers with the second received identifiers to determine:
        whether there is a first match between the stored user identifier and the second received user identifier,
        whether there is a second match between the stored link layer identifier and the second received link layer identifier, and
        whether there is a third match between the stored device identifier and the second received device identifier; and
    establishing one or more sessions from a previous mobility binding at the mobility gateway if there is the first match and the third match, and not the second match.

2. The method of claim 1, wherein there is no second match because one of the second received link layer identifier and the stored link layer identifier is unavailable.

3. The method of claim 1, further comprising establishing the mobile device to a previously-active session in response to one or more network activation packets indicating the mobile device returning to an active state.

4. The method of claim 1, wherein the subsequent network attach request is triggered by at least one of a Layer 2 Attach Notifier, a dynamic host configuration protocol request, an address resolution protocol request, or a detecting network attachment inquiry.

5. The method of claim 1, further comprising receiving the subsequent network attach request from the mobile device over a second network link.

6. The method of claim 1, wherein the mobility gateway provides mobility using Proxy Mobile IPv6 (PMIPv6), and wherein the mobility gateway is a mobility access gateway (MAG).

7. The method of claim 1, wherein at least one of the stored user identifier and the second received user identifier comprises at least part of a network access identifier (NAI).

8. A gateway comprising:
a network processing unit for performing network operations;
an identity detection module for detecting a media access identity, a user identity and a physical device identity associated with a first mobile device;
an identity cache for storing the media access identity, the user identity and the physical device identity associated with the first mobile device; and
an identity processor module for:
receiving a second media access identity, a second user identity and a second physical device identity associated with a second mobile device;
comparing the stored identities with the received second identities for determining:
whether there is a first match between the stored media access identity and the received second media access identity,
whether there is a second match between the stored user identity and the received second user identity, and
whether there is a third match between the stored physical device identity and the received second physical device identity; and
establishing one or more sessions from a previous mobility binding if there is the first match and the third match and not the second match.

9. The gateway of claim 8, wherein the gateway is configured to provide Proxy Mobile IPv6 (PMIPv6) mobility, and wherein the identity cache is a binding cache, and wherein the first mobile device is a User Equipment (UE).

10. The gateway of claim 8, wherein the network processing unit is configured to receive registration requests.

11. A non-transitory computer-readable medium storing code for execution on a computer system, said code comprising instructions that, when executed by a processor, cause the computer system to:
receive one or more messages from a mobile device at a mobility gateway containing a user identifier, a link layer identifier, and a device identifier;
store the user identifier, the link layer identifier, and the device identifier at the mobility gateway;
receive a subsequent network attach request containing second received identifiers, including at least a user identifier, a link layer identifier, and a device identifier;
compare the stored set of identifiers with the second received identifiers to determine:
whether there is a first match between the stored user identifier and the second received user identifier,
whether there is a second match between the stored link layer identifier and the second received link layer identifier, and
whether there is a third match between the stored device identifier and the second received device identifier; and
establish one or more sessions from a previous mobility binding at the mobility gateway if there is the first match and the third match, and not the second match.

12. The non-transitory computer-readable medium of claim 11, wherein the code further comprises instructions to cause the computer system to establish the mobile device to a previously-active session in response to a packet indicating the mobile device returning to an active state.

13. The non-transitory computer-readable medium of claim 11, wherein the code further comprises instructions to cause the computer system to provide Proxy Mobile IPv6 (PMIPv6) mobility and receive address resolution protocol (ARP) requests.

14. The non-transitory computer-readable medium of claim 11, wherein at least one of the stored user identifier and the second received user identifier comprises at least part of a network access identifier (NAI).

* * * * *